US009014391B2

(12) United States Patent
Münch et al.

(10) Patent No.: US 9,014,391 B2
(45) Date of Patent: Apr. 21, 2015

(54) SYSTEM FOR CONTROLLING AUDIO REPRODUCTION

(75) Inventors: Tobias Münch, Straubenhardt (DE); Philipp Schmauderer, Höfen (DE); Christoph Benz, Ohlsbach (DE); Andreas Körner, Waldbronn (DE)

(73) Assignee: Harman Becker Automotive Systems GmbH, Karlsbad (DE)

( * ) Notice: Subject to any disclaimer, the term of this patent is extended or adjusted under 35 U.S.C. 154(b) by 289 days.

(21) Appl. No.: 13/536,759

(22) Filed: Jun. 28, 2012

(65) Prior Publication Data

US 2013/0003986 A1 Jan. 3, 2013

(30) Foreign Application Priority Data

Jun. 29, 2011 (EP) .................................... 11005299

(51) Int. Cl.

| | |
|---|---|
| ***H04B 3/00*** | (2006.01) |
| ***H04H 20/10*** | (2008.01) |
| ***H04H 60/37*** | (2008.01) |
| ***H04H 60/65*** | (2008.01) |
| *G10L 25/78* | (2013.01) |
| *H04H 60/47* | (2008.01) |
| *H04H 60/46* | (2008.01) |

(52) U.S. Cl.

CPC .............. *H04H 20/106* (2013.01); *G10L 25/78* (2013.01); *H04H 60/47* (2013.01); *H04H 60/372* (2013.01); *H04H 60/46* (2013.01); *H04H 60/65* (2013.01)

(58) Field of Classification Search

USPC ...................... 455/3.04, 3.06; 725/34; 381/80

See application file for complete search history.

(56) References Cited

U.S. PATENT DOCUMENTS

| | | | | |
|---|---|---|---|---|
| 7,366,461 B1 * | 4/2008 | Brown | ........................ | 455/3.06 |
| 2010/0268360 A1 | 10/2010 | Ingrassia et al. | | |

FOREIGN PATENT DOCUMENTS

| | | |
|---|---|---|
| EP | 1 569 443 A1 | 8/2005 |
| WO | WO 2006/112822 A1 | 10/2006 |

OTHER PUBLICATIONS

European Search Report from corresponding European patent application No. 11 00 5299, 6pp., Dec. 15, 2011.

Zhouyu Fu et al., A Survey of Audio-Based Music Classification and Annotation, IEEE Transactions on Multimedia, vol. 13, No. 2, 17pp., Apr. 2011.

European examination report for corresponding Appln. No. 11 005 299.0, mailed Jun. 5, 2014, 4 pages.

* cited by examiner

*Primary Examiner* — Alexander Jamal

(74) *Attorney, Agent, or Firm* — Brooks Kushman P.C.

(57) ABSTRACT

A system for controlling audio reproduction may include an interface operable to receive a data stream of an audio signal. The system may also include a processor. The processor may be operable to: analyze the data stream; divide the data stream into segments; associate audio classes with respective segments in accordance with audio classifications and the analysis of the data stream; and replace one or more of the segments associated with a specific audio class, with an audio file, based on information regarding the audio file and information regarding the specific audio class. Further, the system may include another interface operable to output a signal derived from the audio file, to drive a loudspeaker.

19 Claims, 4 Drawing Sheets

SYSTEM FOR CONTROLLING AUDIO REPRODUCTION

PRIORITY CLAIM

This application claims the benefit of priority from European Patent Application No. 11 005 299.0, filed Jun. 29, 2011, which is incorporated by reference.

BACKGROUND OF THE INVENTION

1. Technical Field

The invention relates to audio reproduction.

2. Related Art

Radio Data System (RDS) and Radio Broadcast Data System (RBDS) are communications protocol standards for embedding digital information in radio broadcasts. European Broadcasting Union (EBU) started RDS; however, RDS and similar standards have become international. The RDS is now an international standard of the International Electrotechnical Commission (IEC).

RDS standardizes several types of information transmitted, including a time signal, station identification, and program information. Commonly, the program information may include a classification of a program. For example, a music program may be classified by genre, mood, artist, and instrumentation.

SUMMARY

A system for controlling audio reproduction. The system may include an interface operable to receive a data stream of an audio signal or an interface operable to receive a time signal with respect to the data stream (wherein the received time signal is from a local clock circuit or a source external to the system). The system may also include a processor. The processor may be operable to analyze the data stream and the time signal. The processor may also be operable to divide the data stream into segments. The processor may be operable to associate audio classes to the segments in accordance with audio classifications and the analysis of the data stream and the time signal. In addition, the processor may be operable to replace one or more of the segments with an audio file. The replaced one or more segments are segments associated with a specific audio class of the audio classes. Further, this replacement may be performed with respect to information regarding the audio file and information regarding the specific audio class.

Furthermore, the system may include another interface operable to output an audible signal derived from the audio file, via a loudspeaker.

With respect to the information regarding the audio file, such information may be from a database. In such a case, the database may be accessible via a local area network, a wide area network, or a local bus (The database may be stored locally in an electronic device containing the processor, for example).

Besides receiving the information regarding the audio file, the system may include an interface operable to receive digital information regarding the data stream. In such a case, the processor may be further operable to: analyze the digital information regarding the data stream; associate the audio classes to the segments also in accordance with the analysis of the digital information regarding the data stream; or replace one or more of the segments associated with a specific audio class of the audio classes, with an audio file, and further with respect to the digital information regarding the data stream.

Also, the system may include another interface operable to receive user input. In such a case, the processor may be further operable to associate the audio classes to the segments further in accordance with the user input. Also, the processor may be further operable to replace one or more of the segments associated with a specific audio class of the audio classes, with an audio file, and further with respect to the user input.

With respect to analyzing the data stream, the analysis may include analyzing spectral centroid, spectral rolloff, spectral flux, spectral rolloff, or spectral bandwidth of the data stream. Further, the associating audio classes to the segments may include comparing one or more of these spectral features of the data stream with spectral features of the audio classes, respectively. Also, the analysis of the data stream may include transforming the data stream via a Fourier Transform or a wavelet transform.

Other systems, methods, features and advantages may be, or may become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The system for controlling audio reproduction (the SCAR) may be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE PREFERRED EMBODIMENTS

Figure 1:
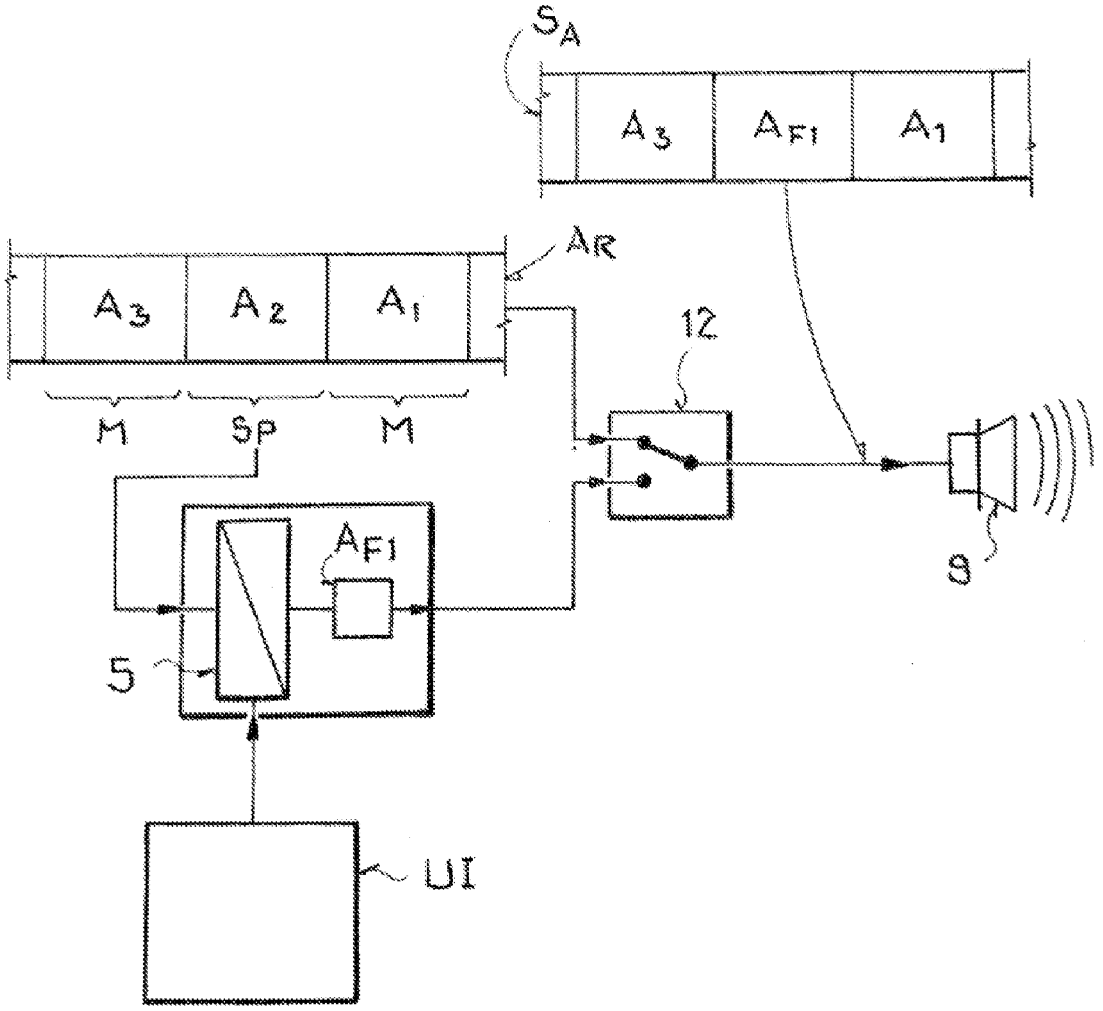
FIG. 1 is a functional schematic diagram of an example aspect of the SCAR.

It is to be understood that the following description of examples of implementations are given only for the purpose of illustration and are not to be taken in a limiting sense. The partitioning of examples in function blocks, modules or units shown in the drawings is not to be construed as indicating that these function blocks, modules or units are necessarily implemented as physically separate units. Functional blocks, modules or units shown or described may be implemented as separate units, circuits, chips, functions, modules, or circuit elements. One or more functional blocks or units may also be implemented in a common circuit, chip, circuit element or unit.

Described herein is a system for controlling audio reproduction (the SCAR). The SCAR may be an information system, such as one used in a motor vehicle, for example.

With respect to one embodiment of the SCAR, the SCAR or an aspect of the SCAR may have a receiver operable to receive a data stream of an audio signal. The receiver may include, an Amplitude Modulation/Frequency Modulation (AM/FM) receiver, a Digital Audio Broadcasting (DAB) receiver, a High Definition (HD) receiver, a Digital Radio Mondiale (DRM) receiver, a satellite receiver, or a receiver for Internet radio, for example.

The audio signal may include a digital data stream that may be received continuously. A digital-to-analog converter may convert the data stream of the audio signal to analog signal that may then be amplified and output as audible sound, via a loudspeaker.

The data stream may be subdivided into segments. The segments optionally follow one another directly in time signal. In an embodiment, the segments have a constant time length. In another embodiment, the beginning or end of the segments may be determined using an analysis of the data stream.

With respect to the SCAR, the segments of the data stream may be assigned to audio classes according to audio classifications by means of an analysis of the data stream and a current time of day. For analysis of the data stream, optionally features such as Spectral Centroid (SC), Spectral Rolloff (SR), Spectral Flux (SF) or Spectral Bandwidth (SB) of the data stream may be compared with corresponding features of an applicable audio class. In addition to the analysis of the data stream, a current time of day may be analyzed. The current time of day may be outputted from a clock circuit or received through the Internet or a radio connection, for example.

An audio class of the audio classifications may be defined by a profile, which may be inputted by a user, for example. Also, a user may select a music only profile or talk only profile, for example. An audio class after being defined may be stored as an audio file.

A segment of the data stream may be replaced by an audio file, where bits of the data stream may be converted into bits of an audio file, for example. To replace a segment with an audio file, the SCAR may utilize crossfading between the data stream and the audio file. Alternatively, the SCAR may mute and unmute the data stream and the audio file, respectively. While a segment of the data stream may be replaced by an audio file, the data stream may not be outputted as an analog signal. Instead, the audio file may be outputted through a loudspeaker as an analog signal during the replacement. After the replacement, for example, outputting the data stream may be continued.

In one embodiment, the SCAR may include a control unit, which may connect to a receiver via an interface. The control unit may include a computing unit such as a processor or a microcontroller for running hardware, firmware, or software based instructions, wherein the instructions may be hardware, software, or firmware. The SCAR may also include an input unit, which may be connected to the control unit, via an interface. The input unit, for example, may facilitate a user to enter information into the SCAR. For example, the input unit may include a touch screen.

The control unit may be configured to subdivide the data stream into segments and to assign the segments of the data stream to classes of audio classifications by analyzing the data stream. The control unit may include and/or connect to memory for buffering the segments of the data stream, where the buffered segments may be analyzed as well. The control unit may be configured to carry out the analysis, such as spectral analysis. In addition to the analysis of the data stream, the control unit may be configured to analyze a current time of day. The current time of day may be outputted from a clock circuit or received from another source, such as through the Internet or FM radio, for example.

Further, the control unit may be configured to define at least one audio class of the audio classifications through a user input, wherein the user input may be made through the input unit. The control unit may also be configured to replace a plurality of segments of the data stream that may be assigned to a defined audio class into an audio file, to facilitate outputting the audio file as an analog signal through a loudspeaker, for example.

In addition to the analysis of the data stream, received digital information may be analyzed in order to assign the segments. The received digital information may be RDS data or ID3 tags (ID3 being a metadata container often used in conjunction with the MP3 audio file format). In one example, the received digital information may be a program guide of a broadcasting station. The program guide may be received via a predefined digital signal, such as EPG (Electronic Program Guide) included in a DAB or retrieved from a database via the Internet, for example.

Alternatively, a provision may be made for a data stream of an audio signal and received digital information to be analyzed in order to determine an audio file from the database. For example, immediately preceding segments of the data stream may be analyzed in order to determine a piece of music from the database that is as similar as possible to the preceding pieces of music in the respective segments, such as, for example, where the segments are from a same musician artist.

With respect to an audio file or digital information determined or received, respectively, from a database, the database may be a local database. The local database may be connected to the control unit through a data interface. For example, the SCAR may include a memory device, such as a hard disk, for storing data of a database. Alternatively, the database may be connected to the control unit through a network, such as a LAN connection, for example, or through a WAN connection, such as an Internet connection.

FIG. 1 is a functional schematic diagram of an example aspect of the SCAR. In general, depicted is radio program that may be received by an example of the SCAR. The radio program has a variety of content, such as music, spoken material, news, and advertising, for example. For the radio program, a data stream AR of an audio signal may be transmitted, e.g., by a broadcasting station and may be received by a receiver. Then an aspect of the SCAR may analyze the received data stream AR of the audio signal for controlling the audio reproduction. Next, the data stream AR of the audio signal may be outputted as an analog signal SA through a loudspeaker 9.

The data stream AR may be subdivided into segments, such as segments A1, A2, and A3. For example, the subdivision can take place in a time-controlled manner, such as every five seconds, or may be based on an analysis of the received data stream AR. It may be possible to use short segments, such as 100 ms segments or shorter ones. The quality of determining current audio classes, such as classes M and Sp, may be enhanced by the length of the segments. Additionally, a time shift function may be used to eliminate segments after being classified to a class, such as class M or Sp. Audio classes may be defined by audio classifications for content of the received radio programs. For the sake of brevity, only two audio classes, classes M and Sp (one audio class, class M, for music and one audio class, class Sp, for spoken material), are shown in FIG. 1. In other examples, a greater variety of audio classes may be provided. For example, classes may be given for different spoken information, such as narration, radio drama, news, or traffic information, and for different music styles, such as techno, rap, rock, pop, classical, or jazz.

With respect to determining the current time of day, algorithms, such as fuzzy logic type algorithms, make it possible to determine precisely audio classes, such as the classes M and Sp, of the individual segments, such as segments A1, A2, and A3. For example, rapid change between spoken content and music within a segment can be identified to be an advertisement, for example, by further analyzing the current time of day. By analyzing a data stream, such as the data stream AR, via spectral analysis, for example, and the current time of day, via fuzzy logic, for example, segments of a data stream may be assigned to one or more audio classes in accordance with the audio classifications. Received digital information, such as RDS data or ID3 tags, may be additionally analyzed in order to determine the audio classes.

At least one audio class, such as Sp, of the audio classifications may be defined by a user input UI. In such a case, the user can regulate which audio classes of a received radio program to play. If the user configures the SCAR, as shown in FIG. 1, to no spoken material, for example, transitions to speech content may be detected, and a crossfade to music may take place. As shown, a plurality of segments may be assigned to a defined audio class. Further, the assigned plurality of segments of a data stream may be replaced by an audio file, such as AF1. The audio file, such as, AF1, may then be outputted as an analog signal, such as SA, through a loudspeaker, such as loudspeaker 9. For example, as depicted, a crossfade unit, such as crossfade unit 12, may be provided for crossfading from the first segment A1 of the received data stream AR to the audio file AF1 and for further crossfading from the audio file AF1 to the third segment A3. In the example depicted in FIG. 1, the audio file AF1 may be read out of a database 5, for example, based on a programmable playlist.

Also shown in FIG. 1, is a case in which initially a first segment A1, then the audio file AF1, and after that, a third segment A3, may be outputted via the loudspeaker 9 as an analog signal SA. The second segment A2 of the received data stream AR may be replaced by the audio file AF1 based on the input UI and an assignment of the second segment A2 to the audio class Sp, which may be defined by the user. In the background, analysis of the data stream AR continues, so that when another change from the audio class Sp (such as a spoken material class) to the audio class M (such as a music class) takes place, it may be possible to crossfade back to the received radio program and thereby resume reproduction of the data stream AR.

The user can set the SCAR to receive streams with talk only content, for example. This can be done via the user input UI, which would result, for example, in local talk content from a local database being played during music or advertising breaks, for example. Alternatively, any desired mixed settings may be possible. It may be also possible to play an audio book from the local database that is interrupted by music or news from a radio station and then subsequently continued, if such a request is inputted by the user, for example. Thus, the aspect of the SCAR depicted in FIG. 1 offers a user an option of replacing certain program portions of a received radio program with content from a local database, such as the database 5, for example.

Figure 2:
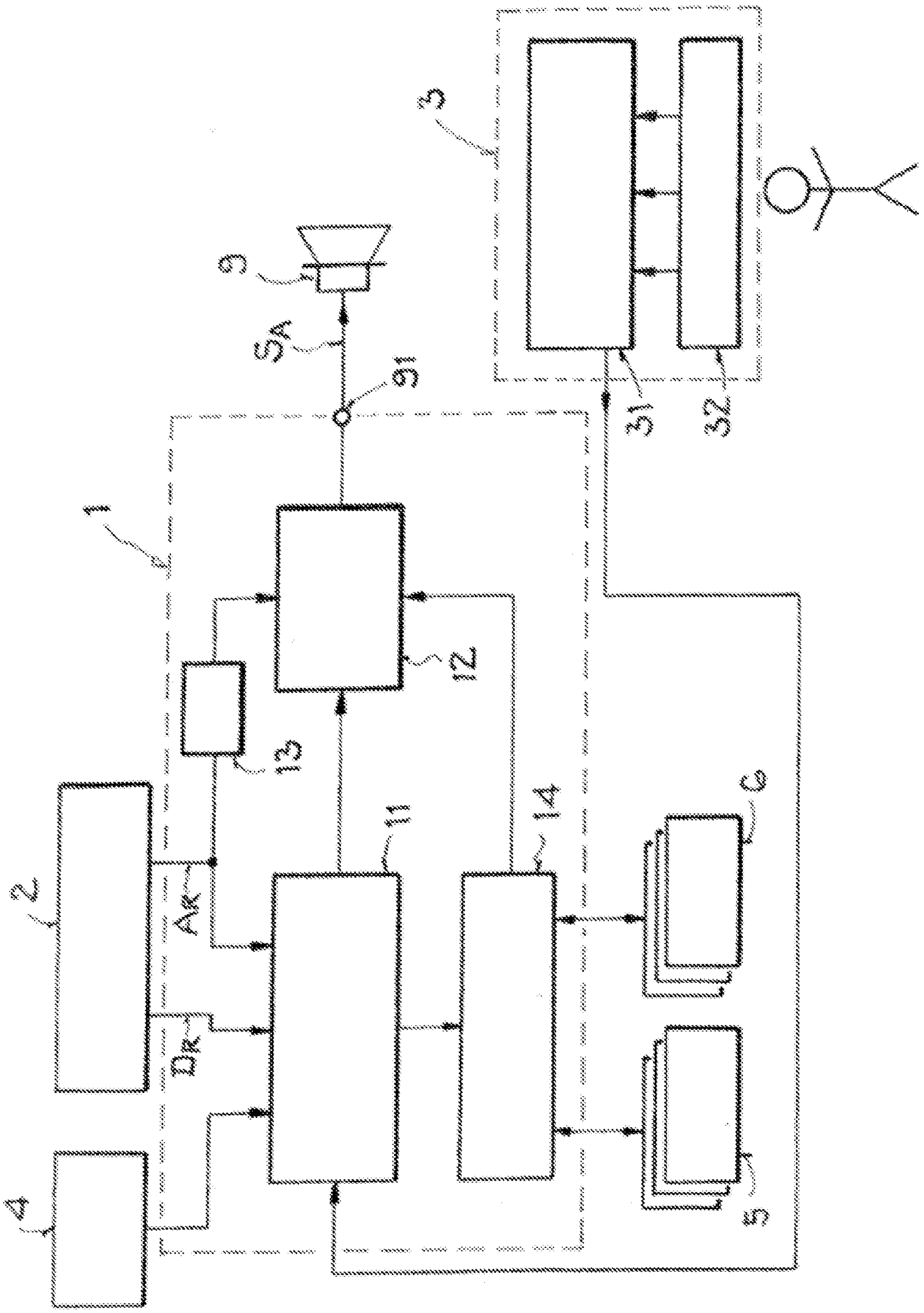
FIG. 2 is a block diagram of an example aspect of the SCAR.

FIG. 2 is a block diagram of another example aspect of the SCAR, used for audio reproduction.

The aspect of FIG. 2 has a receiving unit 2 for receiving a data stream AR of an audio signal. The receiving unit may include, for example, an AM/FM receiver, a DAB receiver, an HD receiver, a DRM receiver, a satellite receiver or a receiver for Internet radio.

In this aspect, for example, the data stream AR of the audio signal may flow to an analysis unit 11, which may be part of the control unit 1. The analysis unit 11 may be configured to subdivide the data stream AR into segments A1, A2, and A3, for example, and to assign the segments A1, A2, and A3 to classes M and Sp, for example. To perform this subdivision, the analysis unit 11 may be configured to analyze the data stream AR. For analysis, a transform may be used. For example, a Fourier Transform or a wavelet transform may be used for the analysis. In one embodiment, the analysis unit 11 may be additionally configured to communicate with an external analysis unit 4. For example, segments A1, A2, and A3 may be transmitted at least partially to the external analysis unit 4; wherein the external analysis unit 4 sends back results of its analysis of the segments. The external analysis unit 4 may be, for example, a database, such as a database containing information about the contents of audio compact discs and vinyl records using a fingerprinting function, so that a small piece (such as a segment) of the audio stream may be sent to the database, via the Internet, for example. This database may also respond with corresponding ID3-Tag information.

As shown in FIG. 2, in addition to the data stream AR, the analysis unit 11 of the control unit 1 may be configured to analyze digital information DR, which may be received by a receiving unit 2. Such digital information DR may be RDS data or an ID3 tag, for example, associated with the data stream AR.

For purpose of control, the analysis unit 11 may be connected to a crossfade unit 12 that allows crossfading between digital or analog signals from various audio sources. Also, the analysis unit 11 may drive the crossfade unit 12 so that the data stream AR may be delayed by a delay unit 13, and so that it also may be outputted by the loudspeaker 9 as an analog signal SA, via interface 91; wherein the control unit 1 may be connected to the receiving unit 2 and the interface 91.

The embodiment of the SCAR depicted in FIG. 2 may also have an input unit 3, which may be connected to the control unit 1. The input unit 3 may include a user interface, such as a touch screen 32, for example. The control unit 1 may be configured to define at least one audio class, such as class Sp, of the audio classifications via a user input UI inputted via the input unit 3. A profile may be selected by the user via an acquisition unit 31 of the input unit 3, for example. In such a case, one or more audio classes can be defined in association with a profile of a user. The acquisition unit 31 of the input unit 3 may be connected to the control unit 1 for this purpose.

The analysis unit 11 of the control unit 1 may be configured to subdivide the data stream AR into segments, such as segments A1, A2, and A3, for example. Each segment may be a predetermined length of time (e.g., 100 ms). Further, the analysis unit 11 analyzes and assigns, according to the analysis, the segments of the data stream AR to classes, such as classes M and Sp (see FIG. 1), of the audio classifications. Furthermore, the received digital data DR can additionally be analyzed and classified by the analysis unit 11. Additionally the current time of day may be analyzed. For example, a speech segment can be detected and then assigned to a full hour of a news program. The combination of a detected time signal or time period and the detected speech segment result in a determination of an audio class "news program", for example.

In addition, the control unit 1 may be configured to replace a plurality of segments of the data stream AR that may be replaced by an audio file, such as audio file AF1. The audio file AF1 may be outputted as an analog signal SA through the interface 91 and the loudspeaker 9. For the purpose of determining the audio file AF1, the control unit 1 has a suggestion unit 14, which may be connected to a local memory, for example the database 5, a memory card, or the like, or to a network data memory 6 through a network (e.g., through a radio network, LAN network, or the Internet). Alternatively, the suggestion unit 14 of the control unit 1 may be connected to another data source for determining the audio file AF1.

Figure 3:
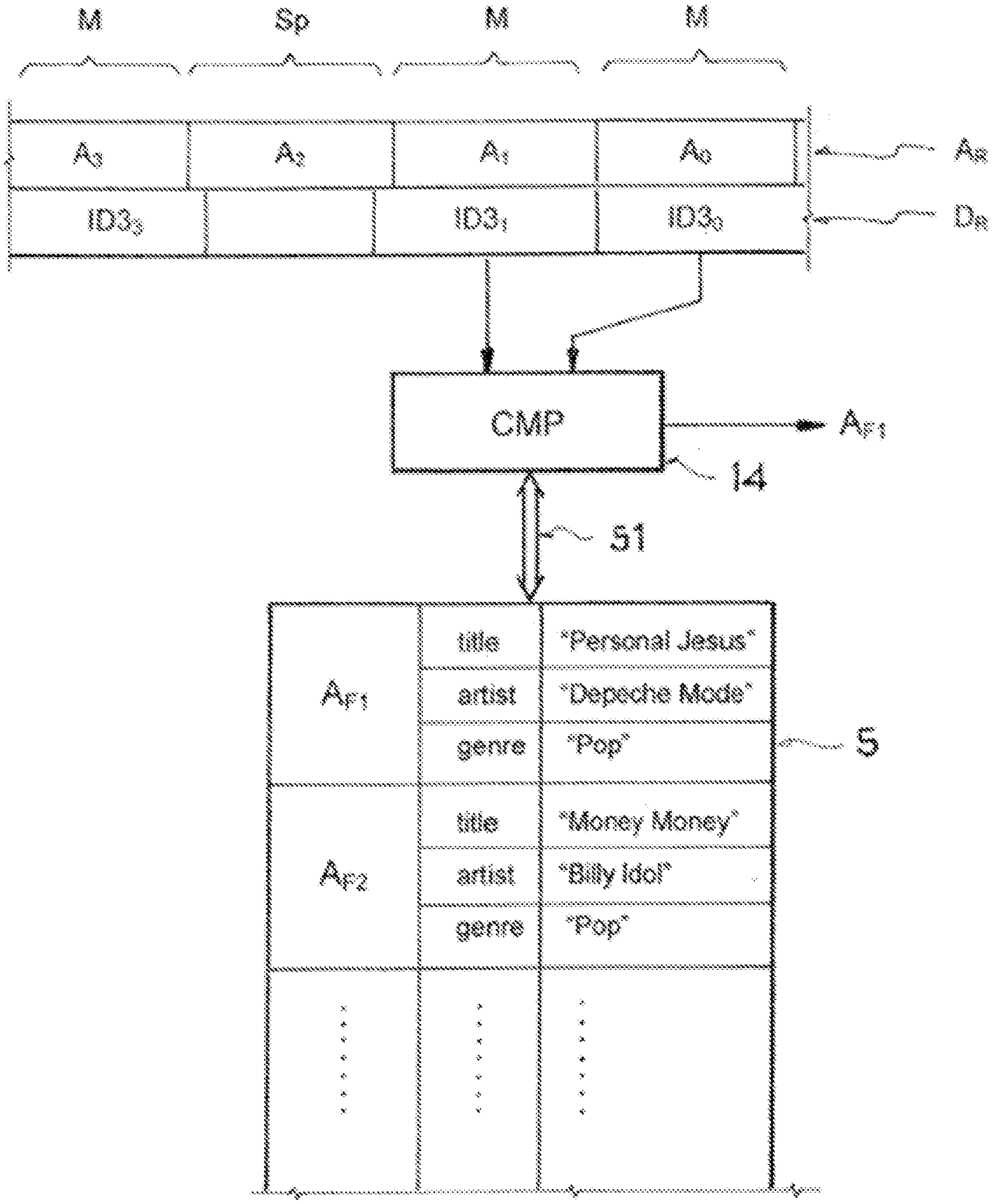
FIG. 3 is another functional schematic diagram of an example aspect of the SCAR.

An example of the suggestion unit's 14 operation is shown schematically in FIG. 3. The suggestion unit 14 in FIG. 3 may be connected to the database 5 through a network connection 51. Two entries from the database 5 are shown schematically and in abbreviated form. With respect to the database 5, metadata "title," "artist," "genre" formatted as ID3 tags may be assigned to a first audio file AF1 and a second audio file AF2. For example, the title: "Personal Jesus," the artist: "Depeche Mode" and the genre: "pop" may be assigned to the first audio file AF1. The second audio file AF2 may be assigned the title: "Mony Mony," the artist: "Billy Idol" and the genre: "Pop."

The suggestion unit 14 depicted in FIG. 3 may be configured to select one of the audio files AF1 and AF2 based on a comparison of the metadata of the audio files AF1 and AF2 with the received digital data DR. In this case, for example, the received digital information may contain ID3 tags ID30, ID31, and ID33, each of which may be associated with a segment A0, A1, A2, and A3 of the data stream AR of the audio signal, for example. As depicted, an ID3 tag may be associated with one or more audio segments.

As mentioned above, examples of the SCAR are not limited to the variants shown in FIGS. 1 through 3. For example, it may be possible to use different receivers. Also, a receiver of the SCAR may be scanned with respect to its current reception, and may be provided as a source for crossfading by a crossfading unit, such as the crossfade unit 12. In the case of crossfading, when an advertisement may be detected, for example, crossfading to another source can occur without advertising taking place.

Table of Reference Characters for FIGS. 1-3

| | |
|---|---|
| 1 | control unit |
| 11 | analysis unit |
| 12 | crossfade unit |
| 13 | delay unit |
| 14, CMP | suggestion unit, comparison unit |
| 2 | receiving unit |
| 3 | input unit |
| 31 | acquisition unit |
| 32 | touch screen |
| 4 | external database |
| 5 | local database, local memory |
| 51 | network, interface |
| 6 | network attached database |
| 9 | loudspeaker |
| 91 | interface, connection |
| $_R$ | data stream of an audio signal |
| $A_0$, A1, A2, and A3 | segment of the data stream |
| $A_{F1}$, $A_{F2}$ | audio file |
| $D_R$ | digital information |
| M and Sp | audio class |
| $S_A$ | analog signal |
| UI | user input |

Figure 4:
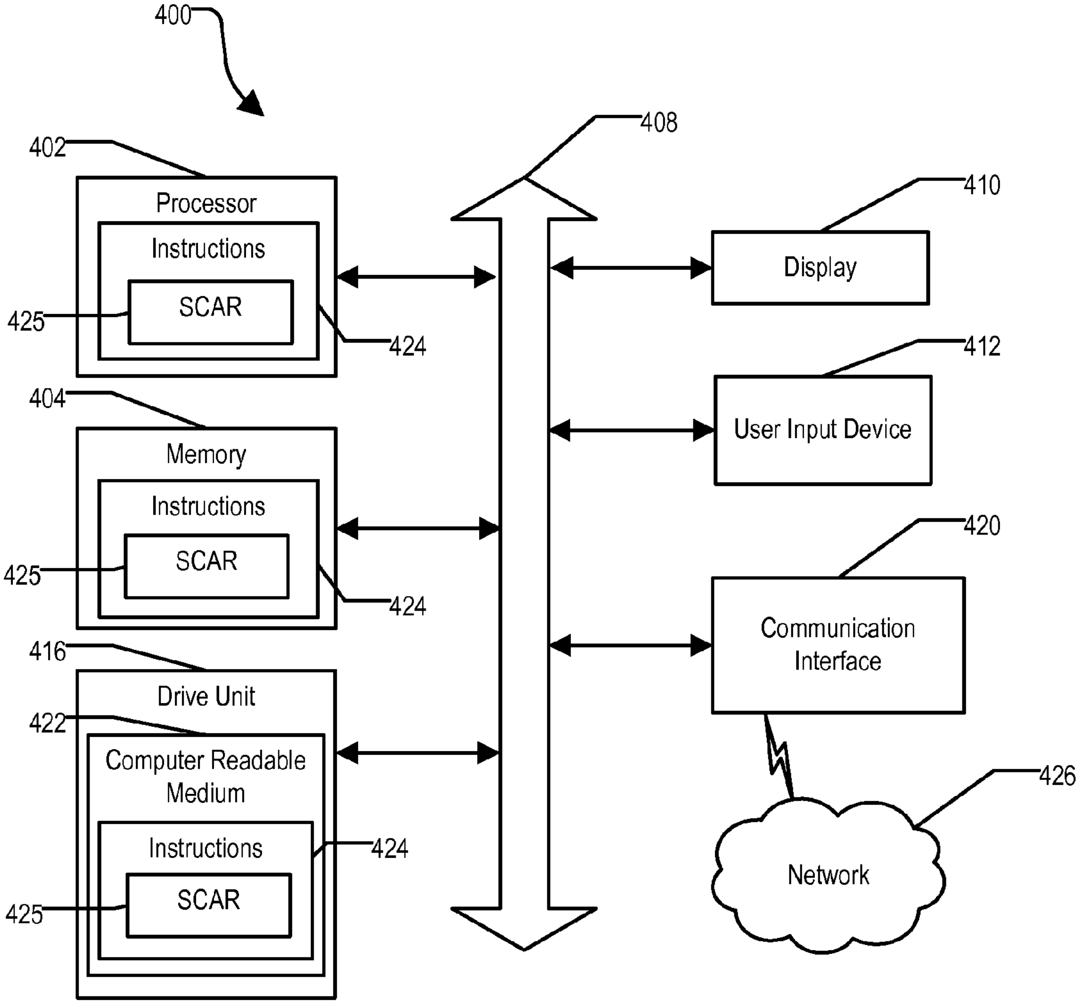
FIG. 4 is a block diagram of an example computer system that may be included or used with a component of the SCAR.

Furthermore, the SCAR, one or more aspects of the SCAR, or any other device or system operating in conjunction with the SCAR may be or may include a portion or all of one or more computing devices of various kinds, such as the computer system 400 in FIG. 4. The computer system 400 may include a set of instructions that can be executed to cause the computer system 400 to perform any one or more of the methods or computer based functions disclosed. The computer system 400 may operate as a standalone device or may be connected, e.g., using a network, to other computer systems or peripheral devices.

In a networked deployment, the computer system 400 may operate in the capacity of a server or as a client user computer in a server-client user network environment, as a peer computer system in a peer-to-peer (or distributed) network environment, or in various other ways. The computer system 400 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. The computer system 400 may be implemented using electronic devices that provide voice, audio, video or data communication. While a single computer system 400 is illustrated, the term "system" may include any collection of systems or sub-systems that individually or jointly execute a set, or multiple sets, of instructions to perform one or more computer functions.

The computer system 400 may include a processor 402, such as a central processing unit (CPU), a graphics processing unit (GPU), a digital signal processor, or some combination of different or the same processors. The processor 402 may be a component in a variety of systems. For example, the processor 402 may be part of a standard personal computer or a workstation. The processor 402 may be one or more general processors, digital signal processors, application specific integrated circuits, field programmable gate arrays, servers, networks, digital circuits, analog circuits, combinations thereof, or other now known or later developed devices for analyzing and processing data. The processor 402 may implement a software program, such as code generated manually or programmed.

The term "module" may be defined to include a plurality of executable modules. The modules may include software, hardware, firmware, or some combination thereof executable by a processor, such as processor 402. Software modules may include instructions stored in memory, such as memory 404, or another memory device, that may be executable by the processor 402 or other processor. Hardware modules may include various devices, components, circuits, gates, circuit boards, and the like that are executable, directed, or controlled for performance by the processor 402.

The computer system 400 may include a memory 404, such as a memory 404 that can communicate via a bus 408. The memory 404 may be a main memory, a static memory, or a dynamic memory. The memory 404 may include, but is not limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one example, the memory 404 includes a cache or random access memory for the processor 402. In alternative examples, the memory 404 may be separate from the processor 402, such as a cache memory of a processor, the system memory, or other memory. The memory 404 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 404 is operable to store instructions executable by the processor

402. The functions, acts or tasks illustrated in the figures or described may be performed by the programmed processor 402 executing the instructions stored in the memory 404. The functions, acts or tasks may be independent of the particular type of instructions set, storage media, processor or processing strategy and may be performed by software, hardware, integrated circuits, firm-ware, micro-code and the like, operating alone or in combination. Likewise, processing strategies may include multiprocessing, multitasking, parallel processing and the like.

A computer readable medium or machine readable medium may include any non-transitory memory device that includes or stores software for use by or in connection with an instruction executable system, apparatus, or device. The machine readable medium may be an electronic, magnetic, optical, electromagnetic, infrared, or semiconductor system, apparatus, or device. Examples may include a portable magnetic or optical disk, a volatile memory such as Random Access Memory "RAM", a read-only memory "ROM", or an Erasable Programmable Read-Only Memory "EPROM" or Flash memory. A machine readable memory may also include a non-transitory tangible medium upon which software is stored. The software may be electronically stored as an image or in another format (such as through an optical scan), then compiled, or interpreted or otherwise processed.

The computer system 400 may or may not further include a display unit 410, such as a liquid crystal display (LCD), an organic light emitting diode (OLED), a flat panel display, a solid state display, a cathode ray tube (CRT), a projector, a printer or other now known or later developed display device for outputting determined information. The display 410 may act as an interface for the user to see the functioning of the processor 402, or specifically as an interface with the software stored in the memory 404 or in the drive unit 416.

The computer system 400 may include an input device 412 configured to allow a user to interact with any of the components of computer system. The input device 412 may be a keypad, a keyboard, or a cursor control device, such as a mouse, or a joystick, touch screen display, remote control or any other device operative to interact with the computer system 400. A user of the navigation system 100 may, for example, input criteria or conditions to be considered by the navigation device 102 in calculating a route using the input device 412.

The computer system 400 may include a disk or optical drive unit 416. The disk drive unit 416 may include a computer-readable medium 422 in which one or more sets of instructions 424 or software can be embedded. The instructions 424 may embody one or more of the methods or logic described herein, including aspects of the SCAR 425. The instructions 424 may reside completely, or partially, within the memory 404 or within the processor 402 during execution by the computer system 400. The memory 404 and the processor 402 also may include computer-readable media as discussed above.

The computer system 400 may include computer-readable medium that includes instructions 424 or receives and executes instructions 424 responsive to a propagated signal so that a device connected to a network 426 can communicate voice, video, audio, images or any other data over the network 426. The instructions 424 may be transmitted or received over the network 426 via a communication port or interface 420, or using a bus 408. The communication port or interface 420 may be a part of the processor 402 or may be a separate component. The communication port 420 may be created in software or may be a physical connection in hardware. The communication port 420 may be configured to connect with a network 426, external media, the display 410, or any other components in the computer system 400, or combinations thereof. The connection with the network 426 may be a physical connection, such as a wired Ethernet connection or may be established wirelessly as discussed later. The additional connections with other components of the computer system 400 may be physical connections or may be established wirelessly. The network 426 may alternatively be directly connected to the bus 408.

The network 426 may include wired networks, wireless networks, Ethernet AVB networks, or combinations thereof. The wireless network may be a cellular telephone network, an 802.11, 802.16, 802.20, 802.1Q or WiMax network. Further, the network 426 may be a public network, such as the Internet, a private network, such as an intranet, or combinations thereof, and may utilize a variety of networking protocols now available or later developed including, but not limited to TCP/IP based networking protocols. One or more components of the navigation system 100 may communicate with each other by or through the network 426.

The term "computer-readable medium" may include a single storage medium or multiple storage media, such as a centralized or distributed database, or associated caches and servers that store one or more sets of instructions. The term "computer-readable medium" may also include any medium that is capable of storing, encoding or carrying a set of instructions for execution by a processor or that cause a computer system to perform any one or more of the methods or operations disclosed. The "computer-readable medium" may be non-transitory, and may be tangible.

The computer-readable medium may include a solid-state memory such as a memory card or other package that houses one or more non-volatile read-only memories. The computer-readable medium may be a random access memory or other volatile re-writable memory. The computer-readable medium may include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. The computer system 400 may include any one or more of a computer-readable medium or a distribution medium and other equivalents and successor media, in which data or instructions may be stored.

In alternative examples, dedicated hardware implementations, such as application specific integrated circuits, programmable logic arrays and other hardware devices, may be constructed to implement various aspects of the SCAR. One or more examples described may implement functions using two or more specific interconnected hardware modules or devices with related control and data signals that can be communicated between and through modules, or as portions of an application-specific integrated circuit. The SCAR may encompass software, firmware, and hardware implementations.

The SCAR described may be implemented by software programs executable by a computer system. Implementations can include distributed processing, component/object distributed processing, and parallel processing. Alternatively, virtual computer system processing can be constructed to implement various aspects of the SCAR.

The SCAR is not limited to operation with any particular standards and protocols. For example, standards for Internet and other packet switched network transmission (such as TCP/IP, UDP/IP, HTML, and HTTP) may be used. Replacement standards and protocols having the same or similar functions as those disclosed may also or alternatively be used.

To clarify the use in the pending claims and to hereby provide notice to the public, the phrases "at least one of <A>, <B>, . . . and <N>" or "at least one of <A>, <B>, . . . <N>, or combinations thereof" are defined by the Applicant in the broadest sense, superseding any other implied definitions herebefore or hereinafter unless expressly asserted by the Applicant to the contrary, to mean one or more elements selected from the group comprising A, B, . . . and N, that is to say, any combination of one or more of the elements A, B, . . . or N including any one element alone or in combination with one or more of the other elements which may also include, in combination, additional elements not listed.

While various embodiments of the invention have been described, it may be apparent to those of ordinary skill in the art that many more embodiments and implementations are possible within the scope of the invention. Accordingly, the invention is not to be restricted except in light of the attached claims and their equivalents.

We claim:

1. A method performed by an electronic device, comprising:

receiving a user input specifying at least one specific audio class to be replaced;

receiving a data stream of an audio signal from a broadcast for output via a loudspeaker;

generating a modified data stream based on the received data stream and an audio file during the broadcast; and outputting the modified data stream via the loudspeaker during the broadcast, wherein generating the modified data stream comprises:

analyzing the received data stream;

dividing the received data stream into a plurality of segments;

associating audio classes with respective segments of the plurality of segments in accordance with audio classifications and the analysis of the received data stream; and replacing one or more of the plurality of segments associated with the at least one specific audio class of the audio classes, with the audio file, based on information regarding the audio file and information regarding the at least one specific audio class.

2. The method of claim 1, where the information regarding the audio file is from a database.

3. The method of claim 2, where the database is accessible via a local area network.

4. The method of claim 2, where the database is accessible via a wide area network.

5. The method of claim 2, where the database is stored locally in the electronic device performing the method.

6. The method of claim 1, further comprising:

receiving digital information regarding the received data stream;

analyzing the digital information regarding the received data stream; and associating the audio classes to respective segments of the plurality of segments also in accordance with the analysis of the digital information regarding the received data stream.

7. The method of claim 1, further comprising:

receiving digital information regarding the received data stream;

analyzing the digital information regarding the received data stream; and replacing one or more of the plurality of segments associated with a specific audio class of the audio classes, with the audio file, based on the digital information regarding the received data stream.

8. The method of claim 1, further comprising:

receiving user input; and associating the audio classes to respective segments of the plurality of segments in accordance with the user input.

9. The method of claim 1, where the analyzing the received data stream comprises analyzing a spectral centroid of the received data stream, and where the associating audio classes to the respective segments comprises comparing the spectral centroid of the received data stream with spectral centroid features of the audio classes.

10. The method of claim 1, where the analyzing the received data stream comprises analyzing spectral rolloff of the received data stream, and where the associating audio classes to the respective segments comprises comparing the spectral rolloff of the received data stream with spectral rolloff features of the audio classes.

11. The method of claim 1, where the analyzing the received data stream comprises analyzing spectral flux of the received data stream, and where the associating audio classes to the respective segments comprises comparing the spectral flux of the received data stream with spectral flux features of the audio classes.

12. The method of claim 1, where the analyzing the received data stream comprises analyzing spectral bandwidth of the received data stream, and where the associating audio classes to the respective segments comprises comparing the spectral bandwidth of the received data stream with spectral bandwidth features of the audio classes.

13. The method of claim 1, where the analyzing the received data stream comprises transforming the received data stream via a Fourier Transform.

14. The method of claim 1, where the analyzing the received data stream comprises transforming the received data stream via a wavelet transform.

15. A system, comprising:

an input unit operable to receive a user input specifying at least one audio class to be replaced;

a first interface operable to receive a data stream of an audio signal from a broadcast;

a second interface operable to receive a time signal with respect to the data stream;

a third interface operable to output a modified data stream via a loudspeaker during the broadcast; and a processor operable to generate the modified data stream based on the received data stream and an audio file during the broadcast, wherein generating the modified data stream comprises:

analyzing the received data stream and the time signal;

dividing the received data stream into segments;

associating audio classes to respective segments of the segments in accordance with audio classifications, the analysis of the received data stream, and the analysis of the time signal; and replacing one or more of the segments associated with the at least one specific audio class of the audio classes, with the audio file, based on information regarding the audio file and information regarding the at least one specific audio class.

16. The system of claim 15, where the received time signal is from a local clock circuit.

17. The system of claim 15, where the received time signal is from a source external to the system.

18. A device, comprising:

a first receiving unit operable to receive a data stream of an audio signal from a broadcast;

a second receiving unit operable to receive a time signal associated with the data stream;

an input unit operable to receive user input specifying at least one specific audio class to be replaced;

a first interface to a database operable to receive information regarding an audio file from the database;

a second interface operable to output a modified data stream via a loudspeaker during the broadcast; and a control unit operable to generate the modified data stream based on the received data stream and the audio file during the broadcast, wherein generating the modified data stream comprises:

analyzing the received data stream and the time signal;

dividing the received data stream into segments;

associating audio classes with respective segments of the segments in accordance with audio classifications, the analysis of the received data stream, and the time signal; and replacing one or more of the respective segments associated with at least one specific audio class of the audio classes, with the audio file, based on the information regarding the audio file, information regarding the at least one specific audio class, and the user input received from the input unit.

19. The device of claim 18, where the analysis of the received data stream comprises transforming the received data stream via a Fourier Transform or a wavelet transform.

* * * * *